(12) United States Patent
Koch et al.

(10) Patent No.: US 6,444,069 B1
(45) Date of Patent: Sep. 3, 2002

(54) METHOD FOR BONDING AN ACTIVE TAG TO A PATCH AND A TIRE

(75) Inventors: Russell W. Koch, Hartville, OH (US); Guy J. Walenga, Mt. Juliet; Paul B. Wilson, Murfreesboro, both of TN (US)

(73) Assignee: Bridgestone/Firestone North American Tire, LLC, Nashville, TN (US)

( * ) Notice: Subject to any disclaimer, the term of this patent is extended or adjusted under 35 U.S.C. 154(b) by 0 days.

(21) Appl. No.: 09/396,533

(22) Filed: Sep. 15, 1999

Related U.S. Application Data

(62) Division of application No. 08/932,091, filed on Sep. 17, 1997, now Pat. No. 5,971,046.

(51) Int. Cl.[7] .............................................. B29D 30/00
(52) U.S. Cl. ............... 156/123; 152/152.1; 264/272.11; 340/442; 340/449
(58) Field of Search .................. 156/242, 244.12, 156/500, 123; 152/367–373, 152.1; 264/272.11, 272.12, 272.13, 272.14; 340/442, 445, 447, 448, 449; 73/146.2

(56) References Cited

U.S. PATENT DOCUMENTS

| | | | |
|---|---|---|---|
| 3,723,966 A | 3/1973 | Mueller et al. ............... 340/58 |
| 3,787,806 A | 1/1974 | Church ........................ 340/58 |
| 4,067,235 A | 1/1978 | Markland et al. .......... 73/146.5 |
| 4,160,234 A | 7/1979 | Karbo et al. ................. 340/58 |
| 4,220,907 A | 9/1980 | Pappas et al. ................. 322/3 |
| 4,237,728 A | 12/1980 | Betts et al. ................ 73/146.5 |
| 4,319,220 A | 3/1982 | Pappas et al. ................ 340/58 |
| 4,334,215 A * | 6/1982 | Frazier et al. ............... 340/539 |
| 4,399,854 A * | 8/1983 | DiRocco et al. ............ 152/367 |
| 4,578,992 A | 4/1986 | Galasko et al. ............ 73/146.5 |
| 4,588,978 A | 5/1986 | Allen ........................... 340/58 |
| 4,717,905 A | 1/1988 | Morrison, Jr. et al. ........ 340/58 |
| 4,851,809 A | 7/1989 | McAlister .................... 346/442 |
| 4,862,486 A | 8/1989 | Wing et al. .................... 377/16 |
| 4,953,393 A | 9/1990 | Galasko et al. ............ 73/146.5 |
| 5,083,457 A | 1/1992 | Schultz ..................... 73/146.5 |
| 5,181,975 A | 1/1993 | Pollack et al. ........... 152/152.1 |
| 5,218,861 A | 6/1993 | Brown et al. .............. 73/146.5 |
| 5,463,374 A | 10/1995 | Mendez et al. ............. 340/442 |
| 5,472,032 A | 12/1995 | Winston et al. ............. 152/415 |
| 5,479,171 A | 12/1995 | Schuermann ................ 342/44 |
| 5,483,827 A * | 1/1996 | Kulka et al. ............... 73/146.5 |
| 5,500,065 A * | 3/1996 | Koch et al. ................. 156/123 |
| 5,562,787 A | 10/1996 | Koch et al. ................... 156/64 |
| 5,573,610 A | 11/1996 | Koch et al. .............. 152/152.1 |
| 5,573,611 A | 11/1996 | Koch et al. .............. 152/152.1 |

(List continued on next page.)

FOREIGN PATENT DOCUMENTS

| | | |
|---|---|---|
| EP | 0 639 472 A1 | 2/1995 |
| WO | WO 99/29524 | 6/1999 |
| WO | WO 99/29525 | 6/1999 |
| WO | WO 99/53740 | 10/1999 |
| WO | WO 00/02741 | 1/2000 |
| WO | WO 00/07834 | 2/2000 |
| WO | WO 00/08598 | 2/2000 |

*Primary Examiner*—Michael W. Ball
*Assistant Examiner*—Jessica Rossi
(74) *Attorney, Agent, or Firm*—Meredith E. Palmer; Fred H. Zollinger, III; Michael Sand

(57) ABSTRACT

A method and apparatus for bonding an active tag to a patch and assembling the patch to a tire is set forth. A patch assembly and a method for securing an electronic monitoring device having electronic and mechanical components for monitoring at least one engineering condition within a tire, comprising an rigid tag assembly encapsulating the electronic monitoring device, bonded to a vulcanized rubber patch which is secured to the inner cavity of a tire utilizing a layer of dual cure bonding rubber.

23 Claims, 5 Drawing Sheets

U.S. PATENT DOCUMENTS

| | | | |
|---|---|---|---|
| 5,578,261 A | * 11/1996 | Manzione et al. | 264/272.15 |
| 5,587,698 A | 12/1996 | Genna | 340/442 |
| 5,708,411 A | 1/1998 | Hill | 340/447 |
| 5,731,754 A | 3/1998 | Lee, Jr. et al. | 340/447 |
| 5,749,984 A | 5/1998 | Frey et al. | 152/415 |
| 5,761,805 A | * 6/1998 | Guyer | 29/883 |
| 5,877,679 A | 3/1999 | Prottey | 340/442 |
| 5,883,305 A | 3/1999 | Jo et al. | 73/146.5 |
| 5,960,844 A | 10/1999 | Hamaya | 152/152.1 |

* cited by examiner

METHOD FOR BONDING AN ACTIVE TAG TO A PATCH AND A TIRE

CROSS-REFERENCE TO RELATED APPLICATIONS

This Application is a Divisional Application of Ser. No. 08/932,091 filed Sep. 17, 1997 now U.S. Pat. No. 5,971,046; the disclosures of which are incorporated herein by reference.

FIELD OF THE INVENTION

This invention pertains to an apparatus and a method of bonding an active tag to a patch and to a tire. More particularly, this invention sets forth a method and apparatus for encapsulating an electronic device in a rigid material, mounting the device on a vulcanized rubber patch and bonding the rubber patch to a vulcanized tire.

BACKGROUND OF THE INVENTION

It is desirable to monitor engineering conditions of tires, such as wear, internal pressure and internal temperature in order to reduce tire costs and maximize vehicle efficiency. Of course, it is advantageous to perform such monitoring in large truck tires, which are expensive.

Prior art methods of monitoring large truck tires have included passive integrated circuits embedded in the body of the tire, or self-powered circuits which are positioned external to the tire. The passive integrated circuits rely on inductive magnetic coupling or capacitative coupling to energize the circuit, thus providing power to the circuit from a source remote from the tire. Self-powered circuits positioned external to the tire are exposed to damage from the environment such as weather, road hazards and even vandalism.

Recent engineering advances have permitted the installation of monitoring devices having active integrated circuits within tires. One such device is described in U.S. Pat. No. 5,562,787 to Koch et al. entitled "Method of Monitoring Conditions of Vehicle Tires", incorporated herein by reference, and assigned to the assignee of the present invention. These devices include an active circuit powered by a dedicated long life, miniature battery and at least one sensor for detecting, optionally storing and transmitting real time engineering conditions within the tire. Such devices are capable of being programmed to remain in an active, but dormant condition, but will switch automatically to an "awakened" condition in response to an external signal or a condition which exceeds preset limits.

One of the problems faced with such active devices is that they are delicate electronic devices that must operate in the harsh environment of a tire. Thus it is important to secure these devices in the tires to minimize the effect of the harsh tire environment on them, while still permitting them to be exposed to this environment to allow accurate monitoring of the engineering conditions for the life of the tire. These active devices have previously been mounted in tires by first encapsulating the device or power-containing circuit in a material which forms a rigid or semi-rigid encasement about the device, thereby inhibiting straining of the device as a result of applied stresses. Such materials have included non-foam compounds such as urethanes, epoxies, polyester-styrene resins, hard rubber compositions, and the like. The encapsulated device is then placed into a green rubber material which forms a housing or is placed in a green rubber pocket or pouch that becomes part of the tire. The encapsulated device is then permanently set within the rubber material during a subsequent vulcanizing operation. The green rubber material containing the encapsulated device may be assembled to the green tire and then vulcanized with the tire. Alternatively, the green patch containing the encapsulated device may be separately vulcanized and then affixed to a cured tire with a suitable adhesive. In either event, the delicate electronic components of the active tag are exposed to high vulcanizing temperatures which may adversely affect their performance or shorten their life. Additionally, certain components of the device, such as the pressure sensor or a thermistor must remain open to the pressurized tire cavity. The flow of rubber occurring during the vulcanization process can effect the openings to the tire cavity. As set forth in U.S. Pat. No. 5,562,787, the opening to the tire cavity can remain open during the curing operations by placement of a dowel into the opening.

While the methods and apparatus of U.S. Pat. No. 5,562,787 provide an acceptable method of assembling an active chip into a tire cavity, an improved method and apparatus which increases the life of the active chip in the tire is desirable.

SUMMARY OF THE INVENTION

In accordance with the present invention, an improved method and apparatus for assembling an active electronic monitoring device into a tire cavity is disclosed.

The improved method and apparatus increases the life of the electronic monitoring device by minimizing the stress, strain, cyclic fatigue, impact and vibration to which the electronic monitoring device is subjected when properly assembled into a tire. While the location of the device is an important factor in determining the life of an electronic monitoring device located within a tire, so too is the manner in which the device is installed into the tire. A method for securing within a tire an electronic monitoring device for monitoring at least one engineering condition of a tire comprises the steps of encapsulating an electronic monitoring device by placing the electronic monitoring device into a mold having a preselected configuration, the preselected configuration including at least one face having an alternating raised and recessed pattern to increase the surface area of the face. The mold is filled with an epoxy potting material so that the electronic monitoring device is encased by the epoxy. The epoxy potting material is cured to form a rigid tag assembly having a preselected configuration. However, certain electronic components comprising the electronic monitoring device, such as pressure sensors, are assembled in such a manner as to remain free from internal contamination while remaining open to the tire atmosphere as necessary. A rubber tire attachment patch having a preselected configuration is formed. The rubber patch includes a first side for interfacing with the face of the encapsulated rigid tag assembly. This first side has increased surface area, which allows for a better bond with the encapsulated tag. The first side also includes a recessed cavity surrounded by a ridge of material of sufficient height to capture the encapsulated rigid tag assembly This ridge helps to improve the bond between the rubber patch and the encapsulated rigid tag. The patch includes a second opposite side, the second side approximating the contour of the inner liner of the tire. The patch is tapered from the first side toward the second side, with the second side flaring out into a relatively thin configuration, but having a radius approaching the radius of the tire inner liner. The rubber patch is vulcanized at a preselected temperature and for a time sufficient for its vulcanization. After vulcanization, a thin layer of dual cure bonding rubber is applied to the second side of the vulcanized rubber patch. This thin layer of dual cure bonding rubber will permit the assembly of the patch assembly to the inner liner of the tire. A fluid epoxy adhesive is applied to an interface between the encapsulated tag assembly and the rubber patch. The encapsulated tag assembly is assembled into the recessed cavity on the first side of the rubber patch so that the fluid epoxy adhesive is evenly distributed across the interface and flows from the interface between the encapsulated tag assembly and the rubber patch. Of course, the increased surface area of the tag assembly allows for better bonding between the rubber patch and the encapsulated tag. The assembly or the encapsulated tag and the rubber patch is allowed to cure to form a patch assembly. The patch assembly is then assembled to the inner liner of a vulcanized tire by applying an activating cement between the dual cure bonding layer and the inner liner of the tire. This curing process permanently bonds the patch assembly to the inner liner and is diffusion-controlled. Because it is diffusion controlled, the curing must be done for a sufficient amount of time and at a sufficient temperature to allow a strong permanent bond to form. To assure that solid contact is maintained at the interface between the inner liner of the tire and the dual cure bonding layer of the patch assembly, a clamping mechanism is applied to secure the patch assembly to the inner liner during the curing process. The clamping mechanism is applied with sufficient pressure across the interface of the patch assembly and the inner liner to assure intimate contact during curing.

DETAILED DESCRIPTION OF THE PREFERRED EMBODIMENTS

Embodiments of the present invention will be described below with reference to the drawings.

Figure 1:
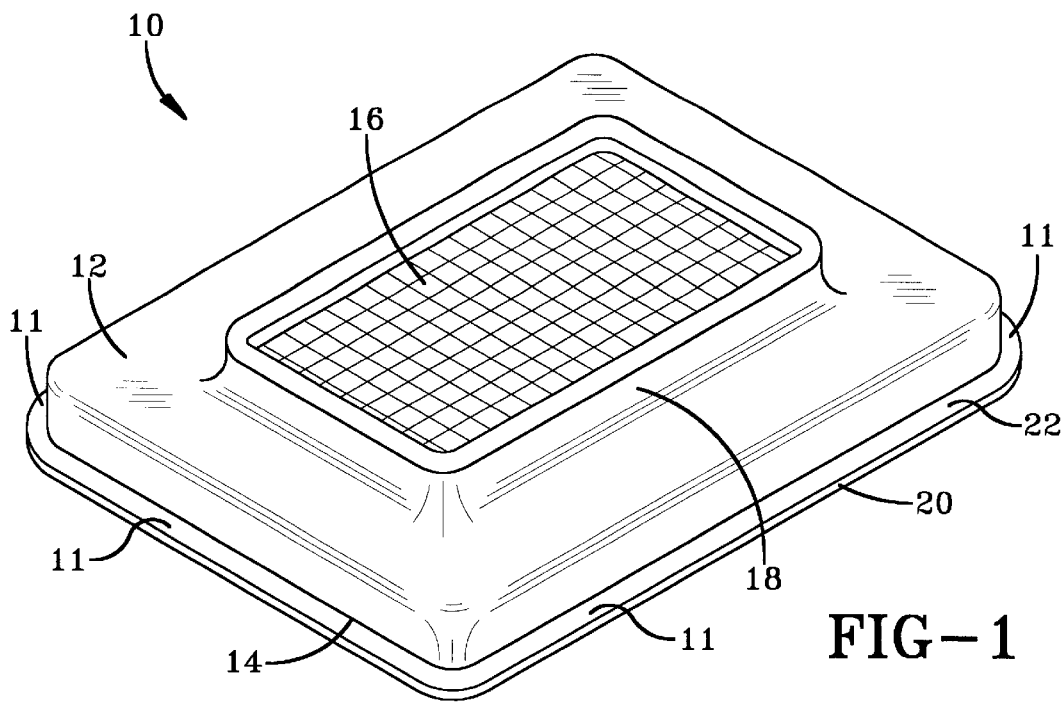
FIG. 1 is a perspective view of the tire patch of the present invention.
Figure 4:
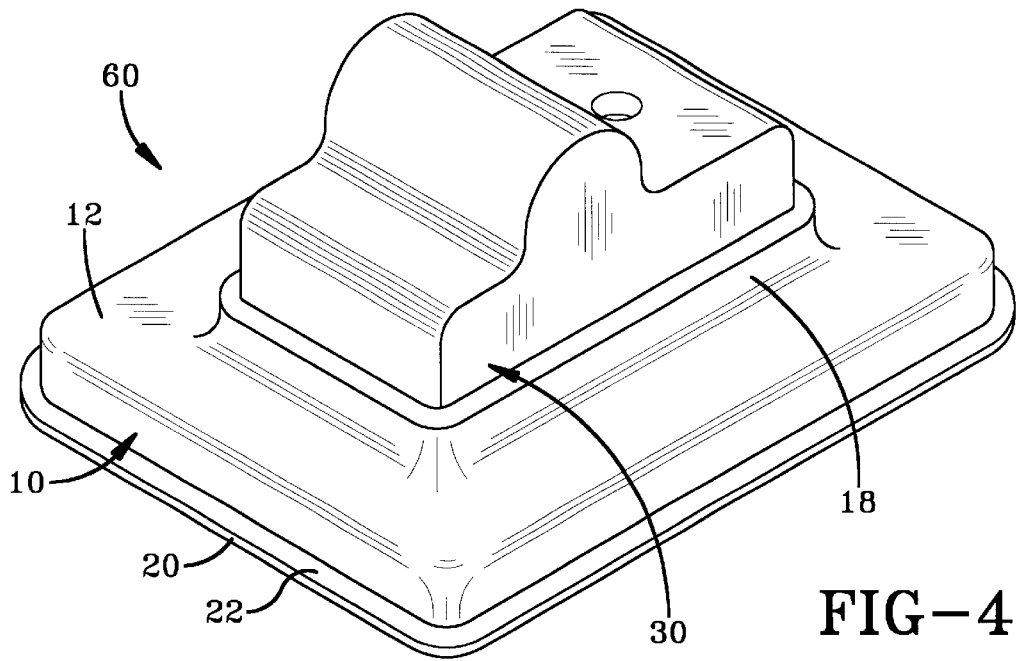
FIG. 4 is a perspective view of the patch assembly of the present invention.

FIG. 1 shows a tire patch 10 of the present invention. The tire patch is of a preselected configuration, which as shown, is rectangular in shape. The patch may be of any other convenient configuration, but is shown as rectangular, and therefore has four edges 11. The tire patch 10 has a first side 12 for interfacing with a face of an encapsulated tag assembly 30, shown in FIG. 2. The patch has a second opposite side 14 approximating the contour of an inner liner of a tire. The contour of the second side 14 preferably is radiused to have about the same radius as the tire to which it is assembled, the radius being larger for larger tires. For very large tires, such as for off-the-road tires, the radius may be eliminated altogether, so that there is no contour and the opposite side is flat, having no contour.

The rubber patch is vulcanized at a preselected temperature and for a time sufficient to vulcanize the patch. The patch may be rubber selected from the group consisting of Ethylene Propylene Diene Monomer (EPDM) rubber, butyl rubber, natural rubber, neoprene and mixtures thereof. One preferred embodiment is a mixture of chlorobutyl rubber and natural rubber. Another preferred embodiment is a mixture of Styrene-Butadiene rubber (SBR) and natural rubber. Typically, patches made of these rubber compositions may be cured by heating to a temperature of about 150° C. and holding at this temperature for about 30 minutes. The time and temperature may be modified as necessary to achieve sufficient curing of the patch for further assembly.

The first side 12 includes a recessed cavity 16 which is surrounded by a raised ridge 18 of rubbery polymer material. The recessed cavity optionally may have a roughened bottom surface to increase its surface area. The ridge 18 preferably is of the same material as the remainder of the patch. The ridge of material should be of sufficient height to capture the encapsulated rigid tag 30. In a preferred embodiment, the ridge is about one eighth (⅛") inch. The patch is gradually tapered from the ridge 18 of material of the first side of the patch 12, outwardly toward the edges of the patch.

Affixed to the second side 14 of the vulcanized tire patch is a dual cure bonding layer 20, which has a [first] second side (not shown) and a [second] first side 22. This dual cure bonding layer 20 may be assembled to the patch at any time following vulcanization of the patch and prior to assembly of the patch assembly to the tire innerliner. The dual cure bonding layer 20 is permanently assembled to the patch. A non-curing cement (not shown) is applied to side 14 of the patch in order to hold the dual cure bonding layer 20 onto the patch. The non-curing cement and the dual cure bonding layer 20 are products of Patch Rubber Company. The important feature of the dual cure bonding layer 20 is that it can be chemically activated and cured, without the need for heating to an elevated temperature. The process is diffusion controlled, however, and some minimal heating will speed the curing process. The dual cure bonding layer 20 may be any material which can be activated and cured to the vulcanized rubber of the tire inner liner and the vulcanized patch. Preferably, however, the dual cure bonding rubber is natural rubber. The dual cure bonding rubber, after application of the activating cement, may cure at room temperature over a period of seventy two (72) hours. However, if more rapid curing is desired this may be accomplished by heating to 45° C. for at least twenty four hours.

Figure 2:
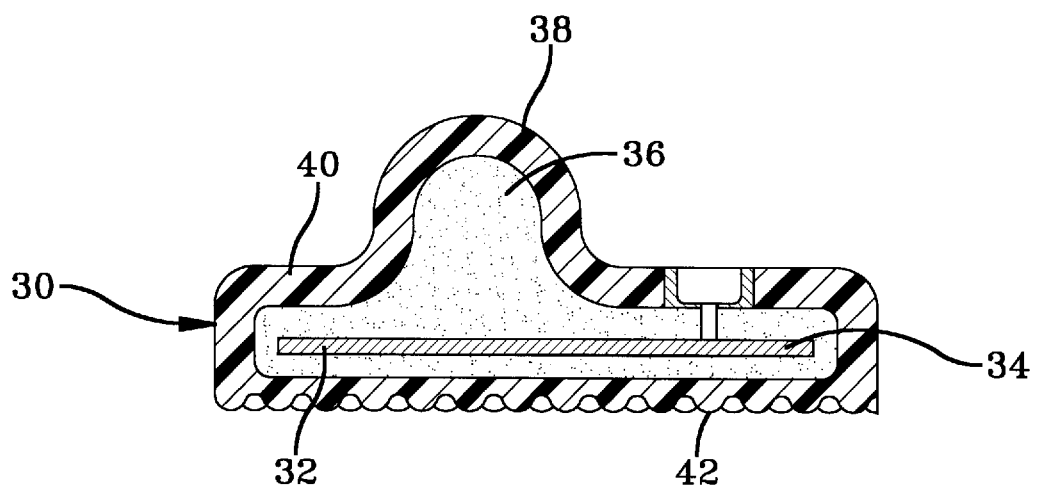
FIG. 2 is a cross-sectional view of the rigid tag assembly, showing the encapsulated electronic monitoring device.

FIG. 2 shows a cross-sectional view of the rigid tag assembly 30, showing the encapsulated electronic monitoring device 32. Monitoring device may be a circuit board 34 which includes electronic memory as well as a variety of sensors for monitoring engineering conditions such as, for example, pressure, temperature and distance traveled. The monitoring device is discussed in detail in U.S. Pat. No. 5,562,787, incorporated herein by reference. Mounted to the board is a power source 36, such a battery, which permits the active monitoring of the engineering conditions, which may be stored in the electronic memory for later use. The power source provides a bulge 38 to the rigid tag assembly, although this feature is expected to become less prominent or even completely eliminated as advances in battery technology produce smaller yet more powerful batteries. The rigid tag assembly may also house an antenna, or may provide for assembly of an antenna which protrudes from the tag assembly so that the circuitry on the board can be activated for transmittal at will.

Figure 3:
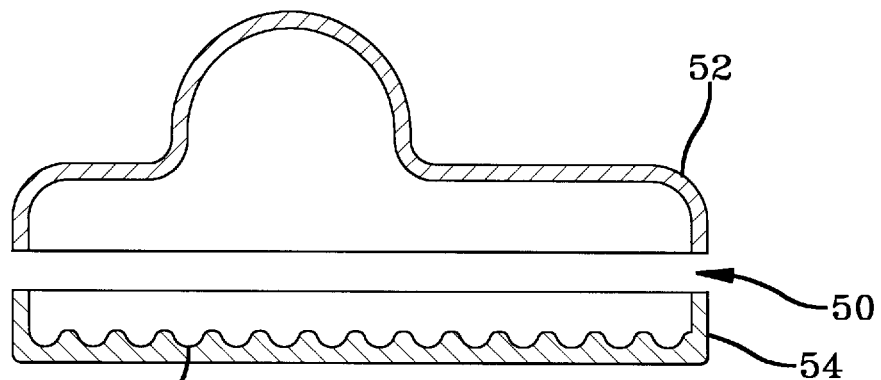
FIG. 3 is a cross-sectional view of the mold used to encapsulate the electronic monitoring device, producing the rigid tag assembly.

The circuit board including sensors, battery and optional antenna, hereinafter referred to as the electronic monitoring device, are encapsulated in a potting material 40 which solidifies into a rigid material. Referring to FIG. 3, the electronic monitoring device is placed within a mold 50 having a first half 52 and a second half 54. At least one of the mold halves has a face with increased surface area, shown as surface 56 in the second half 54 of mold 40. The mold is then filled with the potting material 40 in fluid form, which fills the mold and flows around the electronic monitoring device and allowed to cure, resulting in a rigid tag assembly. Any potting material having a Young's Modulus of at least 30,000 psi and which is capable of being molded around the electronic monitoring device without damaging any of the components of the device. Preferably, the potting material has a Young's Modulus of at least about 100,000 psi. Two preferred potting materials include epoxy and urethane. If desired, the curing of the potting material around the electronic device may be accelerated by preheating the mold to an elevated temperature which is above ambient, but below the temperature at which damage to the electronic monitoring device will occur. A preferred temperature is about 80° C. After the epoxy has been cured, the mold halves 52, 54 are separated, yielding a rigid, encapsulated tag assembly 30. Tag assembly 30 has a bottom surface 42 having increased surface finish which is simply the impression of surface 56 from mold half 54.

Rigid tag assembly 30 is assembled into the recessed cavity 16 on the first side 12 of tire patch 10 either after vulcanization of the patch or after assembly of the dual bond curing layer 20 to the patch. The patch is free of members that cover the upper surface of the electronic monitoring device. In order to permanently adhere tag assembly 30 to patch 10, a fluid adhesive is applied to the interface between tag assembly 30 and recess 16. This adhesive, preferably an epoxy adhesive, may be applied conveniently to surface 42 of tag assembly or to the base of recess 16. As tag assembly 30 is pressed into recessed cavity 16, the epoxy adhesive flows evenly along the interface between surface 42 and the base of recess 16. The increased surface area between the base of recessed cavity 16 and surface 52 provides for additional bonding area and a stronger bond. Because the ridges around the recess are closely dimensioned to correspond to the dimensions of tag assembly 30, excess epoxy will flow between tag assembly 30 and ridge 18, and some epoxy may even flow out from this region. Of course, the flow of epoxy in this region will add to the strength of the assembly as the epoxy cures. While the epoxy can be allowed to cure at room temperature, the curing process can be accelerated by heating the assembly at an elevated temperature, for example a temperature of from about 75–90° C. for at least about 30 minutes. If the dual cure bonding layer 20 has not already been assembled to the second side 14 of tire patch 10, it may be added at this time to form patch assembly 60.

Figure 5:
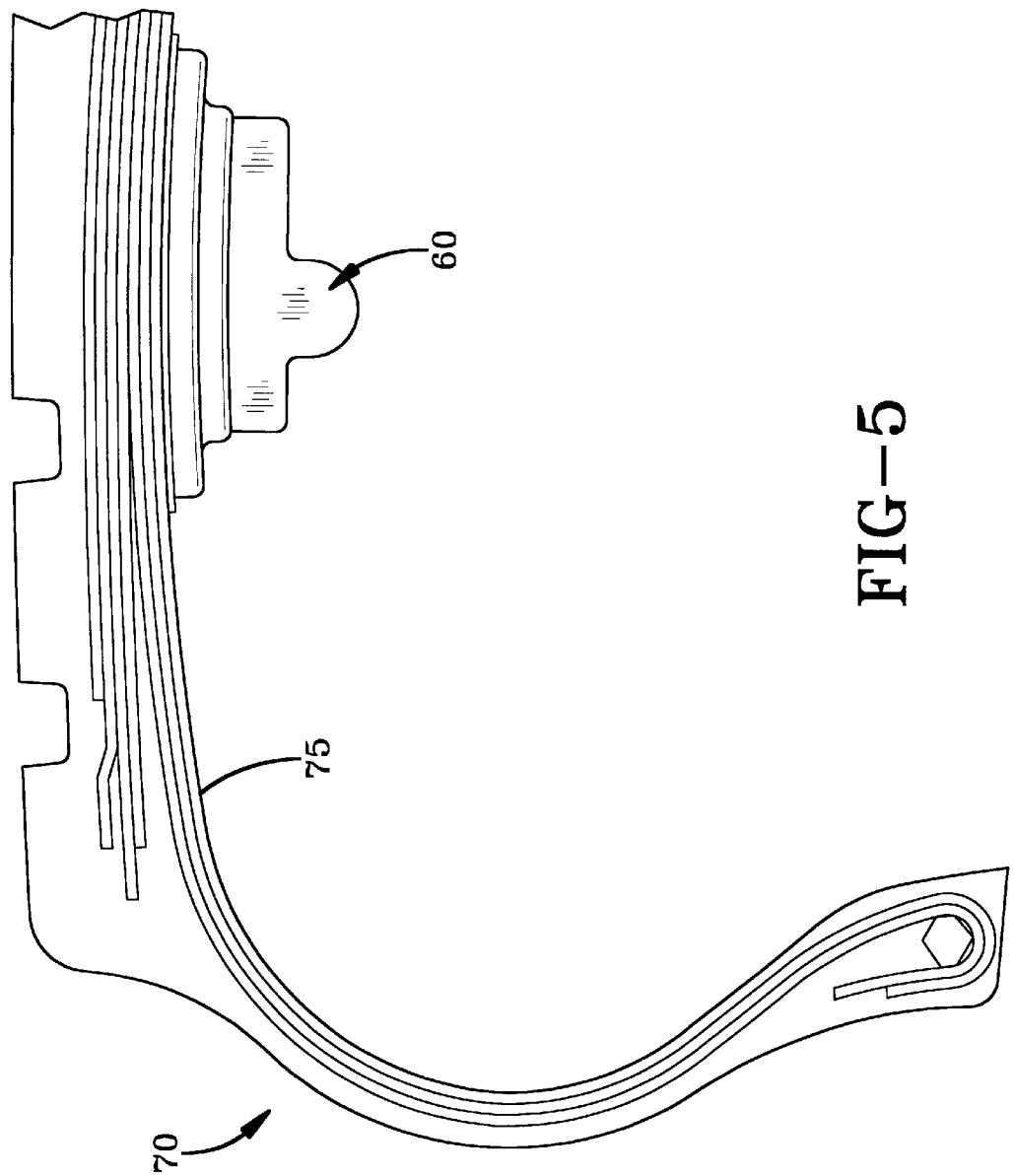
FIG. 5 is a cross-sectional view of the patch assembled to the inner liner of a tire.

Referring now to FIG. 5, Patch assembly 60 was then assembled to the inner liner 75 of tire 70 such that the upper surface of the electronic monitoring device is exposed to the chamber of the tire. Activating cement was first applied to second side [22] (not shown) of dual cure bonding layer 20. The patch assembly was then stitched to the inner liner of the vulcanized tire and the patch assembly/tire assembly was allowed to cure for a sufficient time and temperature to form a strong bond between the tire and the patch assembly. The times and temperatures utilized for this curing may be basically the same times and temperatures as previously discussed. To ensure a strong bond, the patch assembly optionally may be clamped to the tire inner liner 75, until the curing cycle is completed.

Figure 6:
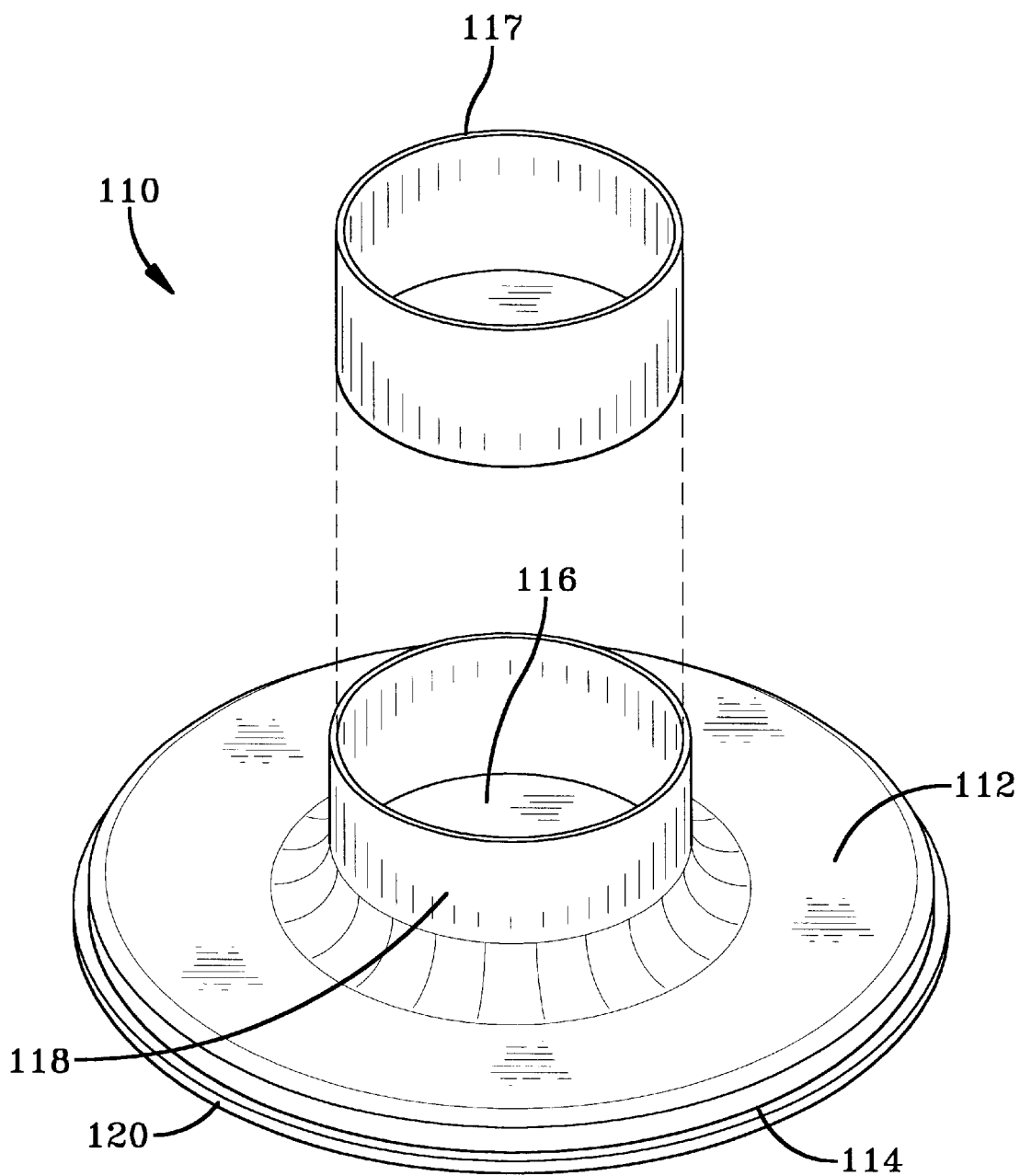
FIG. 6 is a perspective view of an alternative configuration of the tire patch of the present invention.
Figure 7:
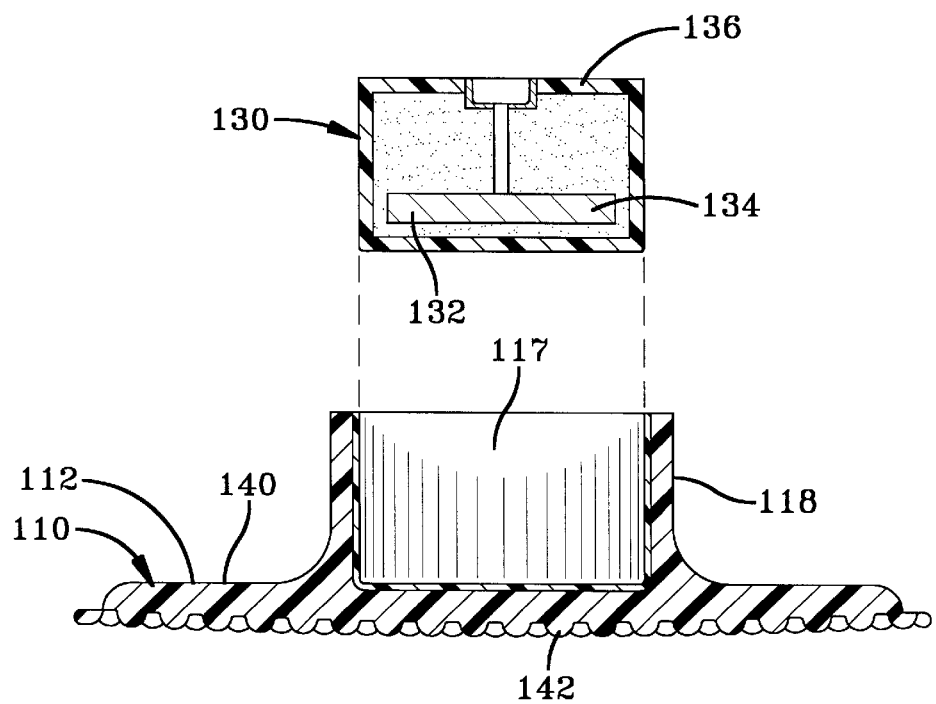
FIG. 7 is a cross-sectional view of the rigid tag assembly of FIG. 6, showing the encapsulated electronic monitoring device.

FIG. 6 shows an alternative configuration of a tire patch 110 of the present invention. The tire patch 110 is of a preselected configuration, which as shown, is round in shape. The tire patch 110 has a first side 112 for interfacing with a face of an encapsulated tag assembly 130, shown in cross-section in FIG. 7. First side 112 includes a recessed cavity 116, which in this alternative configuration is formed by a cylindrical rigid insert 117 molded into the rubber patch. Preferably cylindrical insert 117 is a rigid plastic material, such as nylon, epoxy or a rigid composite material such as glass-filled polyamide or glass-filled epoxy, but also may be a metal, as long as the metal does not interfere with the electronic functions and operation of tag assembly 130. Cylindrical rigid insert 117 is surrounded by a ridge 118 of rubbery material. The ridge preferably is of the same material as the remainder of the patch and should be of sufficient height to permanently hold cylindrical insert 117 in place following curing. In a preferred embodiment shown in FIGS. 6 and 7, the ridge 118 is the same height as cylindrical insert 117. The patch is gradually tapered from the ridge 118 of material of the first side of the patch outwardly toward the edges of the patch. Recessed cavity 116 may have a roughened bottom surface to increase its surface area, as previously described, or alternatively may be smooth and made from the same material as the cylindrical insert. The patch has a second opposite side 114 which may approximate the contour of an inner liner of a tire. The contour of the second side 114 preferably is radiused to have about the same radius as the tire to which it is assembled, the radius being larger for larger tires. For very large tires, such as for off-the-road tires, the radius may be eliminated altogether, so that there is no contour and the opposite side 114 is flat, having no contour. Tire patch 110 including cylindrical rigid insert 117 is cured prior to insertion of rigid tag assembly 130 to form a round patch assembly.

Figure 8:
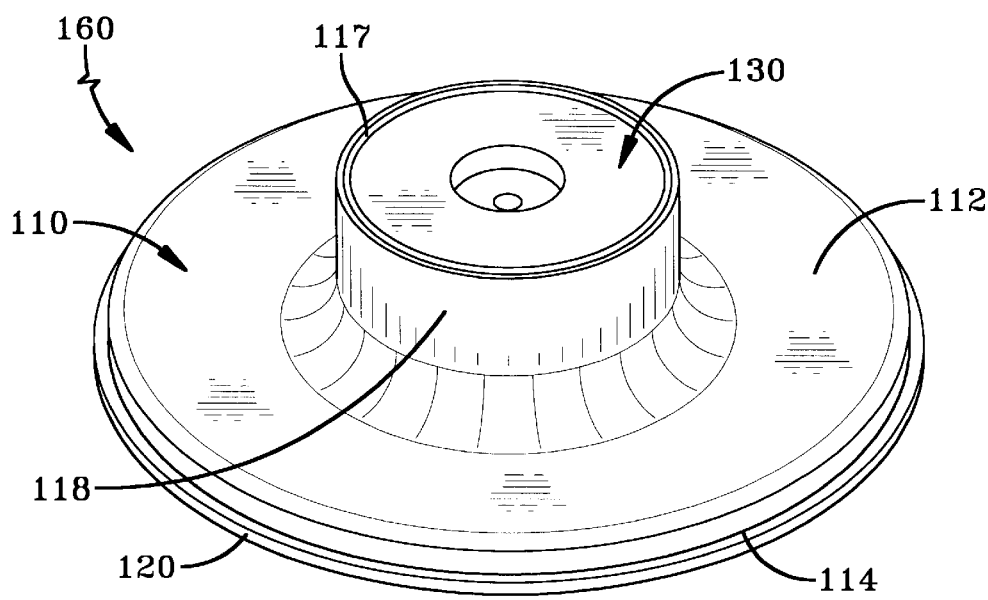
FIG. 8 is a perspective view of the patch assembly of the present invention.

Rigid tag assembly 130, which includes the encapsulated electronic monitoring device and has the same components as previously described, is essentially identical to rigid tag assembly 30 except for its profile, being round or circular instead of rectangular. Round rigid tag assembly 130 is permanently bonded to the round patch assembly by inserting rigid tag assembly 130 into cylindrical insert 117, as shown in FIG. 8, after applying an epoxy adhesive such as a Fusor system manufactured by Lord Corp. of Erie Pa. to the interface between the rigid tag assembly 130 and the cylindrical insert 117. Of course, the epoxy adhesive also may conveniently be applied to the interface between the bottom of cavity 116, whether it is a roughened surface or made of the same or similar material as cylindrical insert 117. As the rigid tag assembly 130 is inserted into cylindrical insert 117, excess epoxy flows out from the interface, which must be removed before it cures. Cylindrical insert 117 only must be of sufficient height so that after curing of the epoxy, there is sufficient bonding strength between the insert 117 and tag assembly 130 to assure no separation. Although the rigid tag assembly 130 may be of the same height as cylindrical insert 117, as shown in the preferred embodiment, it also may be lower or higher than cylindrical insert 117 upon assembly. If tag assembly 130 is higher than the cylindrical insert 117, then insert 117 has a lower profile than the rigid tag assembly 130 so that the outer periphery of the rigid tag assembly 130 extends above the outer periphery of the cylindrical insert 117, thereby reducing the overall amount of material required for tire patch 110.

Patch assembly 160 formed by assembling rigid tag assembly 130 into tire patch 110 is bonded to a tire using the same materials and methods described above for Patch assembly 60.

Patch assemblies manufactured and assembled to a tire inner liner in the manner described above have run through tests equivalent to 100,000 miles, and have remained fully bonded to the tire.

While in accordance with the patent statutes, the best mode and preferred embodiment has been set forth above, the scope of the invention is not limited thereto, but rather by the scope of the attached claims.

What is claimed is:

1. A method for mounting an electronic monitoring device to a tire having an innerliner and a chamber, the method comprising the steps of:
   providing an electronic monitoring device that is adapted to monitor at least one engineering condition of a tire; the electronic monitoring device having an upper surface adapted to face the chamber of the tire;
   providing an attachment patch;
   mounting at least part of the electronic monitoring device to the attachment patch; the attachment patch being free of members that cover the upper surface of the electronic monitoring device such that the upper surface of the electronic monitoring device is exposed to the chamber of the tire when the attachment patch is mounted to the tire; and
   mounting the attachment patch to the tire.

2. The method of claim 1, further comprising the step of applying an adhesive between the electronic monitoring device and the attachment patch to adhesively connect the electronic monitoring device to the attachment patch.

3. A method for mounting an electronic monitoring device to a tire having an innerliner and a chamber, the method comprising the steps of:
   providing an electronic monitoring device that is adapted to monitor at least one engineering condition of a tire; the electronic monitoring device having an upper surface adapted to face the chamber of the tire;
   providing an attachment patch;
   mounting at least part of the electronic monitoring device to the attachment patch; the attachment patch being free of members that cover the upper surface of the electronic monitoring device such that the upper surface of the electronic monitoring device is exposed to the chamber of the tire when the attachment patch is mounted to the tire;
   mounting the attachment patch to the tire; and
   encapsulating the electronic monitoring device with a rigid encapsulation material before the step of mounting the monitoring device to the attachment patch.

4. The method of claim 3, wherein the step of mounting the attachment patch to the tire includes the step of clamping the patch to the tire to provide pressure between the patch and the tire.

5. The method of claim 3, further comprising the step of mounting the attachment patch to the innerliner of the tire.

6. The method of claim 5, wherein the step of mounting includes the step of stitching the attachment patch to the innerliner.

7. The method of claim 3, wherein the step of providing an attachment patch includes the steps of providing a rubber patch having edges, a first side for interfacing with the electronic monitoring device, the first side of the patch including a recess cavity surrounded by a ridge, and the patch being tapered from the ridge toward the edges.

8. The method of claim 3, wherein the step of encapsulating the electronic monitoring device includes the step of placing the electronic monitoring device into a mold having a preselected configuration.

9. The method of claim 8, wherein the step of placing the electronic monitoring device into a mold includes the step of providing a mold including at least one face having an alternating raised and recessed pattern to increase the surface area of the face.

10. The method of claim 8, wherein the step of encapsulating the electronic monitoring device include the steps of filling the mold with an epoxy potting material and curing the epoxy material to form a rigid tag assembly having the preselected configuration.

11. The method of claim 3, wherein the step of providing an attachment patch includes the step of vulcanizing a rubber patch.

12. The method of claim 11, wherein the step of providing the attachment patch includes the step of forming the rubber patch from a mixture of chlorobutyl rubber and natural rubber.

13. The method of claim 11, wherein the step of providing the attachment patch includes the step of forming the rubber patch from a mixture of SBR and natural rubber.

14. The method of claim 11, wherein the step of providing the attachment patch includes the step of forming the rubber patch from a material selected from the group consisting of EPDM rubber, butyl rubber, natural rubber, neoprene, and mixtures thereof.

15. The method of claim 11, wherein the step of vulcanizing a rubber patch includes the step of heating the rubber patch at a temperature of about 150 degrees Celsius for about 30 minutes.

16. The method of claim 11, wherein the step of providing an attachment patch includes the step of providing a recessed cavity on one side of the attachment patch.

17. The method of claim 16, wherein the step of mounting at least part of the electronic monitoring device to the attachment patch includes the step of seating at least a portion of the electronic monitoring device in the recessed cavity.

18. The method of claim 17, further comprising the steps of providing the attachment patch with a textured surface and locating the textured surface in the recessed cavity.

19. The method of claim 17, further comprising the step of placing an adhesive in the recessed cavity prior to performing the step of seating at least a portion of the electronic monitoring device in the recessed cavity.

20. The method of claim 19, wherein the step of seating at least a portion of the electronic monitoring device in the recessed cavity includes the step of assembling the portion of the electronic monitoring device into the recessed cavity so that the adhesive flows from the interface between the portion of the monitoring device and the attachment patch.

21. A method for mounting an electronic monitoring device to a tire having an innerliner and a chamber, the method comprising the steps of:
   providing an electronic monitoring device for monitoring at least one engineering condition of a tire; the electronic monitoring device having an upper surface;
   providing an attachment patch;
   mounting at least part of the electronic monitoring device to the attachment patch such that the upper surface of the electronic monitoring device is exposed to the chamber of the tire;

mounting the attachment patch to the tire;

the step of providing an attachment patch includes the step of providing a layer of uncured rubber to one side of the attachment patch; and the step of mounting the attachment patch to the tire including the steps of positioning the layer of uncured rubber between the attachment patch and the tire and curing the layer of uncured rubber to the tire to mount the patch to the tire.

22. The method of claim 21, wherein the step of curing the layer of uncured rubber includes the step of curing the assembly at a temperature of from about 75 to 90 degrees Celsius for at least 30 minutes.

23. The method of claim 21, wherein the step of providing a layer of uncured rubber includes the step of providing a layer of dual cure bonding rubber, and wherein the step of curing the layer includes the step of applying an activator fluid to the layer of dual cure bonding rubber.

* * * * *